United States Patent [19]

Krumberger

[11] Patent Number: 5,092,377
[45] Date of Patent: Mar. 3, 1992

[54] BUCKET AND FLUID-METERING DEVICE THEREFOR

[75] Inventor: Frederick J. Krumberger, Racine, Wis.

[73] Assignee: S. C. Johnson & Son, Inc., Racine, Wis.

[21] Appl. No.: 586,370

[22] Filed: Sep. 21, 1990

[51] Int. Cl.$^5$ ............................................ G05D 11/13
[52] U.S. Cl. .................... 141/114; 222/325;
141/212; 141/216; 141/314; 137/101.27;
366/151
[58] Field of Search ................ 222/325; 141/114, 198,
141/199-205, 212, 213, 216, 220-224, 229, 98,
311 R, 313, 314; 137/412, 428, 429, 434, 446,
101.27; 366/151, 153; 134/100

[56] References Cited

U.S. PATENT DOCUMENTS

| | | |
|---|---|---|
| 213,161 | 3/1879 | Baldwin . |
| 475,429 | 5/1892 | Zeiser . |
| 2,320,128 | 5/1943 | Hall . |
| 2,337,179 | 12/1943 | Brown . |
| 2,729,382 | 1/1956 | Weber ............................ 141/224 X |
| 3,084,350 | 4/1963 | Anderson . |
| 3,893,470 | 7/1975 | MacPhee et al. ............. 137/101.27 |
| 3,980,206 | 9/1976 | Hancock . |
| 4,252,142 | 2/1981 | Durand-Texte ............... 137/101.27 |
| 4,358,056 | 11/1982 | Greenhut et al. . |

*Primary Examiner*—Ernest G. Cusick

[57] ABSTRACT

In combination with a portable liquid container such as a bucket (20), a liquid-dispensing device (26) is disclosed. Device (26) automatically meters a desired quantity of a dilutable liquid concentrate into bucket (20) whenever bucket (20) is filled to a predetermined level with a suitable diluting liquid. Device (26) comprises a frame (28), a pump (40) mounted on frame (28), and a flexible-plastic pouch (56) containing the liquid concentrate and hung from frame (28). Frame (28) is carried atop a sidewall portion of bucket (20). Pump (40) includes a pump inlet (42), a pump outlet (44), and a pump chamber (46). Pump chamber (46) is in fluid communication with pump inlet (42) and outlet (44). Pouch (56) includes a valved outlet (96) so dimensioned relative to pump inlet (42) as to be removably snugly engaged with pump inlet (42) in a fluid-tight manner. Pump (40) further includes a piston or diaphragm (48) disposed within pump chamber (46) for transferring liquid concentrate from pump inlet (42) via pump chamber (46) to pump outlet (44). Device (26) further includes a float mechanism (66) disposed into bucket (20) and pivotally operatively connected to piston (48) for causing piston (48) to be reciprocatingly movable in piston chamber (46) between first and second positions for purposes of defining a first cycle which causes liquid to be drawn into pump chamber (46) via pump inlet (42) and for purposes of defining a second cycle which causes liquid to be discharged from pump chamber (46) via pump outlet (44). Device (26) still further includes a spring mechanism (142), on frame (28), for biasing float mechanism (66) in the first position.

8 Claims, 6 Drawing Sheets

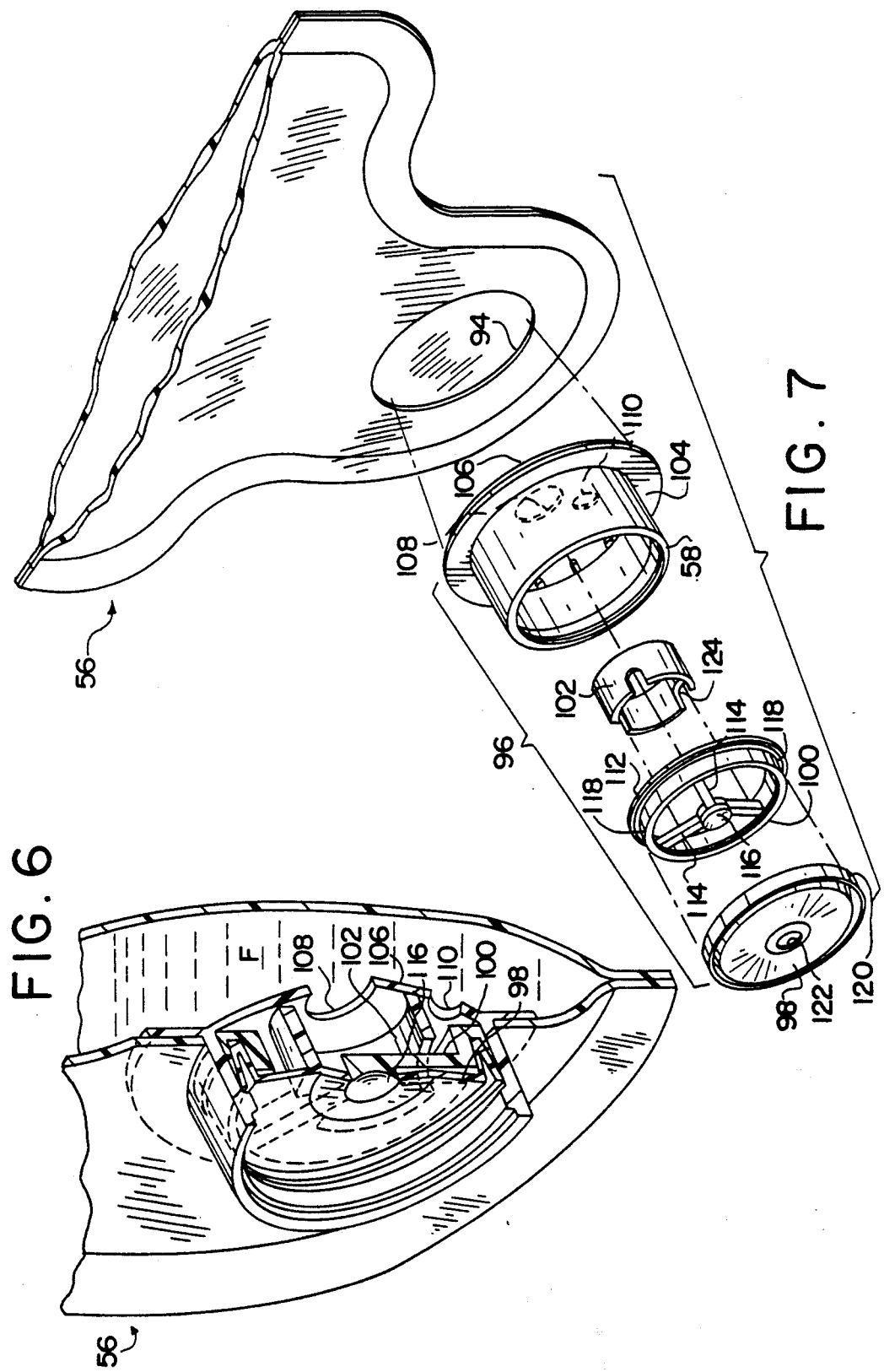

BUCKET AND FLUID-METERING DEVICE THEREFOR

TECHNICAL FIELD

My invention, in general, is directed both to a novel liquid-dispensing or fluid-metering device as well as to a combination comprising a liquid container and the liquid-dispensing device. My invention, in particular, can be used to achieve the automatic in situ mixing of predetermined volumetric respective quantities of a dilutable liquid concentrate and a suitable liquid diluent, for the purpose of producing a liquid mixture of desired concentration.

Still more particularly, the metering device of my invention is able to automatically meter the dilutable liquid concentrate into the bucket or other suitable liquid container, in situ, to produce a concentrate-containing mixture of desired concentration, whenever the bucket is refilled with the diluting fluid to a predetermined liquid level.

BACKGROUND ART

In the past, in situ attempts to prepare liquid mixtures that consist of a dilutable fluid concentrate and a suitable diluting liquid, in predetermined volumetric ratios, have often resulted either in waste of the concentrate or in an other-than-desired amount of concentrate in the mixture.

Consider, for example, a portable 5-gallon bucket, of the type often used by a janitor or other service person to clean a floor. The service person may combine a dilutable liquid concentrate such as a concentrated soap solution with tap water in the bucket to produce a soapy mixture. It is well known, however, that proper dilution directions, even if made available, are not always followed. Accordingly, if the concentration of soap solution in the mixture is so low as to render the mixture ineffective for purposes of removing dirt from the floor, or if the concentration of soap solution in the mixture is so high as to produce streaking on the floor, the result in both instances is clearly undesirable. Furthermore, spillage of the concentrated soap solution on the floor, obviously resulting in waste, may further result in damage to the floor, which is also a clearly undesirable result.

Mixtures containing other-than-desired concentrate levels occur for a variety of reasons, many of which involve error in human judgment. It would be desirable, therefore, to greatly reduce—or even better to totally eliminate—the probability of human error in this regard.

SUMMARY DISCLOSURE OF INVENTION

In combination with a portable liquid container such as a wheeled 5-gallon bucket, a novel liquid-dispensing device will now be summarized. The novel liquid-dispensing device automatically meters a desired quantity of a dilutable liquid concentrate into the container whenever the container is filled to a predetermined level with a suitable diluting liquid such as tap water.

The liquid-dispensing device comprises a frame, a pump removably mounted on the frame, and a flexible-plastic pouch containing the liquid concentrate and preferably hung from the frame. The frame is preferably removably carried atop a sidewall portion of the liquid container. The pump includes a pump inlet, a pump outlet, and a pump chamber. The pump chamber is in fluid communication with the pump inlet and the pump outlet. The pouch includes a valved outlet so dimensioned relative to the pump inlet as to be removably snugly engaged with the pump inlet in a fluid-tight manner. The pump further includes a piston or diaphragm disposed within the pump chamber for transferring liquid concentrate from the pump inlet via the pump chamber to the pump outlet. The liquid-dispensing device further includes a float mechanism removably disposed into the liquid container and pivotally operatively connected to the piston for causing the piston to be reciprocatingly movable in the piston chamber between a first position and a second position (1) for purposes of defining a first cycle which causes liquid to be drawn into the pump chamber via the pump inlet and (2) for purposes of defining a second cycle which causes liquid to be discharged from the pump chamber via the pump outlet. The liquid-dispensing device still further includes a spring mechanism, on the frame, for biasing the float mechanism in the first position.

INDUSTRIAL APPLICABILITY

While my invention is discussed in conjunction with a liquid container of specified volume and type, namely a 5-gallon wheeled bucket, those skilled in the fluid-mixing art can well appreciate that the application of certain principles of my invention will enable the utilization of a wide variety of portable liquid containers of different volumetric capacity and type. For example, when utilizing certain principles of my invention, it may be desirable for the liquid container to be a portable mixing vessel of as much as 500-gallon capacity or even greater.

Furthermore, while my invention is specifically discussed in conjunction with the automatic mixing of predetermined respective volumetric quantities of dilutable liquid soap concentrate and tap water, for the purpose of producing a soapy liquid mixture of desired concentration, those skilled in the fluid-mixing art can well appreciate that the application of certain other principles of my invention will enable the fluid-mixing art practitioners to achieve automatic in situ mixing of predetermined volumetric quantities of any dilutable fluid with a suitable diluting liquid to produce a liquid mixture of any desired concentration.

For example, when utilizing such principles of my invention, it may be desirable to automatically mix or otherwise combine predetermined respective volumetric quantities of an antiseptic liquid concentrate and a suitable sterile liquid to produce a liquid mixture of desired antiseptic concentration; or it may be desirable to automatically mix predetermined respective volumetric quantities of a liquid coating concentrate and a suitable liquid diluent to produce a coating formulation of desired concentration; or it may be desirable to automatically mix predetermined respective volumetric quantities of a liquid herbicidal concentrate and a suitable liquid diluent in a suitably-sized mixing vessel which, for example, may be located on an airplane, to produce a liquid formulation of desired herbicidal concentration for in-flight crop-treating purposes.

BRIEF DESCRIPTION OF THE DRAWINGS

Hereinafter, the term "FIG." shall be understood to be an abbreviation, referring to a particular one of the seven (7) accompanying drawing figures.

FIG. 6 is a partially-fragmented perspective view, partially in phantom line and on an enlarged scale relative to FIGS. 4 and 5, illustrating certain other elements or components of the pouch mentioned above in conjunction with FIG. 2.

FIG. 7 is a partially-fragmented perspective view, on a reduced scale relative to FIG. 6, illustrating in exploded perspective view those elements or components of the pouch mentioned above in conjunction with FIG. 6.

Throughout the several drawing figures briefly described hereinabove, like reference numerals refer to like parts.

BEST MODE FOR CARRYING OUT THE INVENTION

While my invention will now be described with reference to the accompanying illustrated preferred embodiments, it is to be understood that the scope of my invention is not to be limited thereto. On the contrary, as those skilled in the in situ fluid-mixing art can well appreciate, the scope of my invention is to be understood to cover all structural as well as all functional alternatives and equivalents, as are defined by the appended claims.

Figure 1:
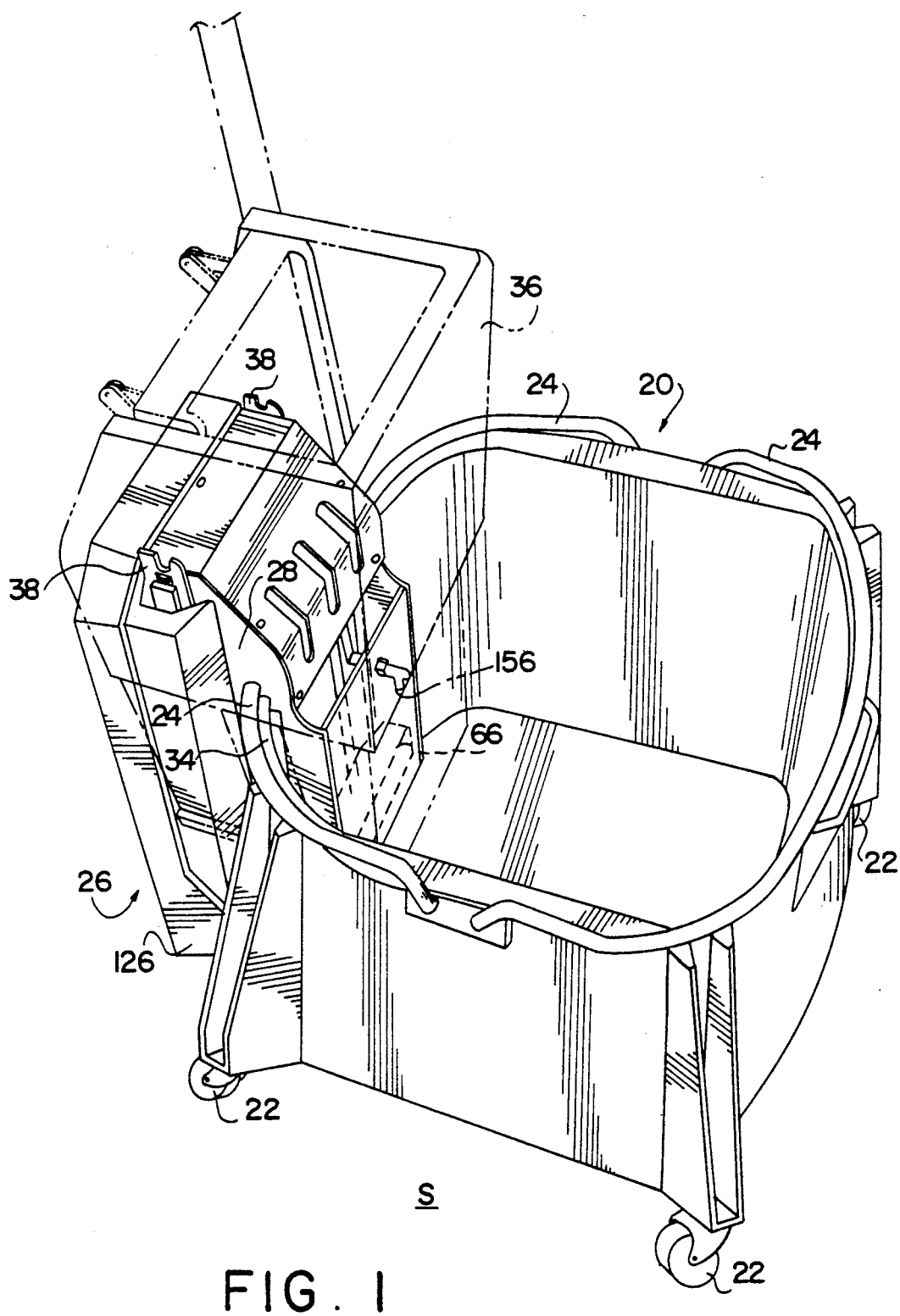
FIG. 1 is a perspective view, illustrating both a wheeled 5-gallon bucket as well as a presently preferred embodiment of a fluid-metering device that is specifically adapted to be removably mounted atop a sidewall portion of the bucket.

In this regard, FIG. 1 depicts a portable 5-gallon pail or bucket 20. Bucket 20 preferably includes a number of axially-pivotable wheels 22 to provide the bucket 20 with desired mobility along a surface "S" (FIG. 1) in a predetermined direction. Bucket 20 further preferably includes a pair of centrally-located pivotable handles 24, for providing the bucket 20 with additional mobility.

The liquid-dispensing or liquid-metering device 26 of my invention is preferably carried atop or removably mounted on an upper sidewall portion of bucket 20. To achieve such a result, device 26 includes a spaced-apart pair of frame members 28. Each such frame member 28 defines a ledge 30 and an indent 32 (FIG. 2), each of which is so respectively shaped and dimensioned relative to an upper lip 34 (FIG. 1) and one of the handles 24 of bucket 20 as to enable the frame 28 to be removably mounted atop a sidewall portion of bucket 20.

The liquid-dispensing or liquid-metering device 26 is, furthermore, preferably so dimensioned relative to a standard-sized commercially-available mop wringer 36 (shown in phantom line in FIG. 1) as to enable the mop wringer 36 to be carried atop or removably mounted on specified structure of the device 26. The wringer 36, in particular, itself preferably rests on spring-biased ears 38, preferably removably affixed to frame 28.

Figure 3:
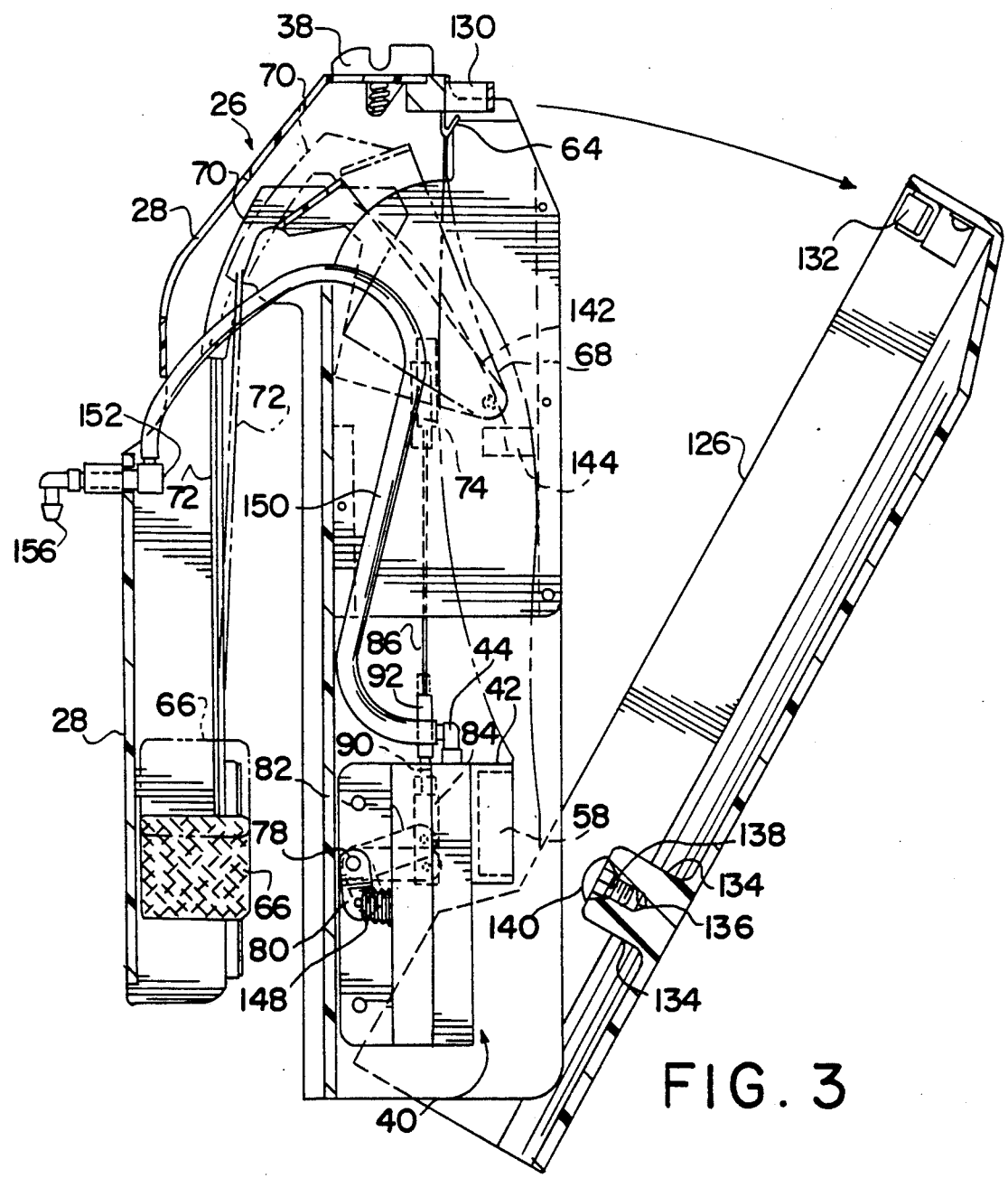
FIG. 3 is a side elevational view, in section, on a still slightly-enlarged scale relative to FIG. 2 and partially in phantom line, of the fluid metering-device shown in FIGS. 1 and 2.
Figure 4:
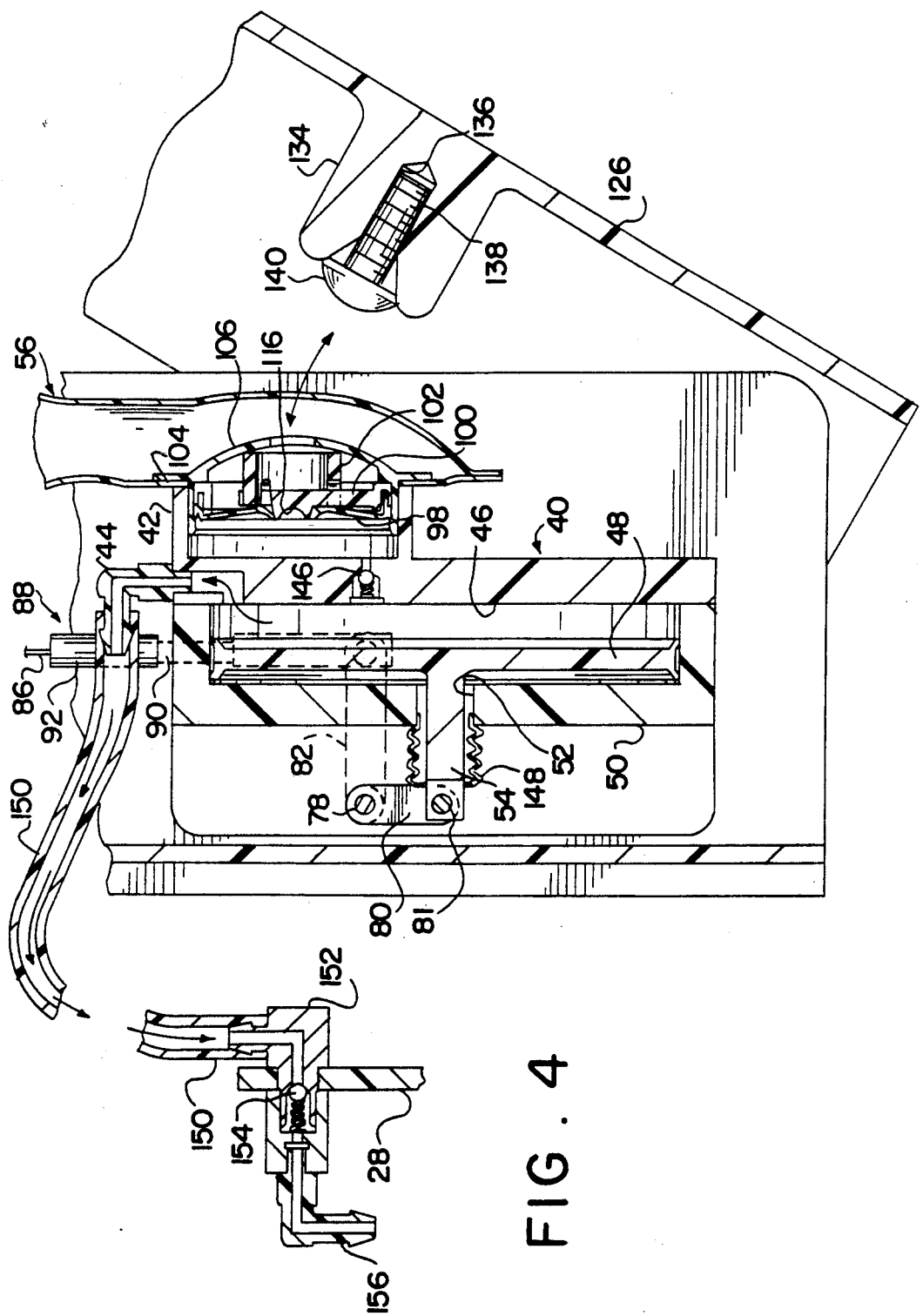
FIG. 4 is a partially-fragmented side view, also in section, on an enlarged scale relative to FIG. 3 and also partially in phantom line, illustrating certain elements or components of the fluid-metering device shown in FIG. 2.
Figure 5:
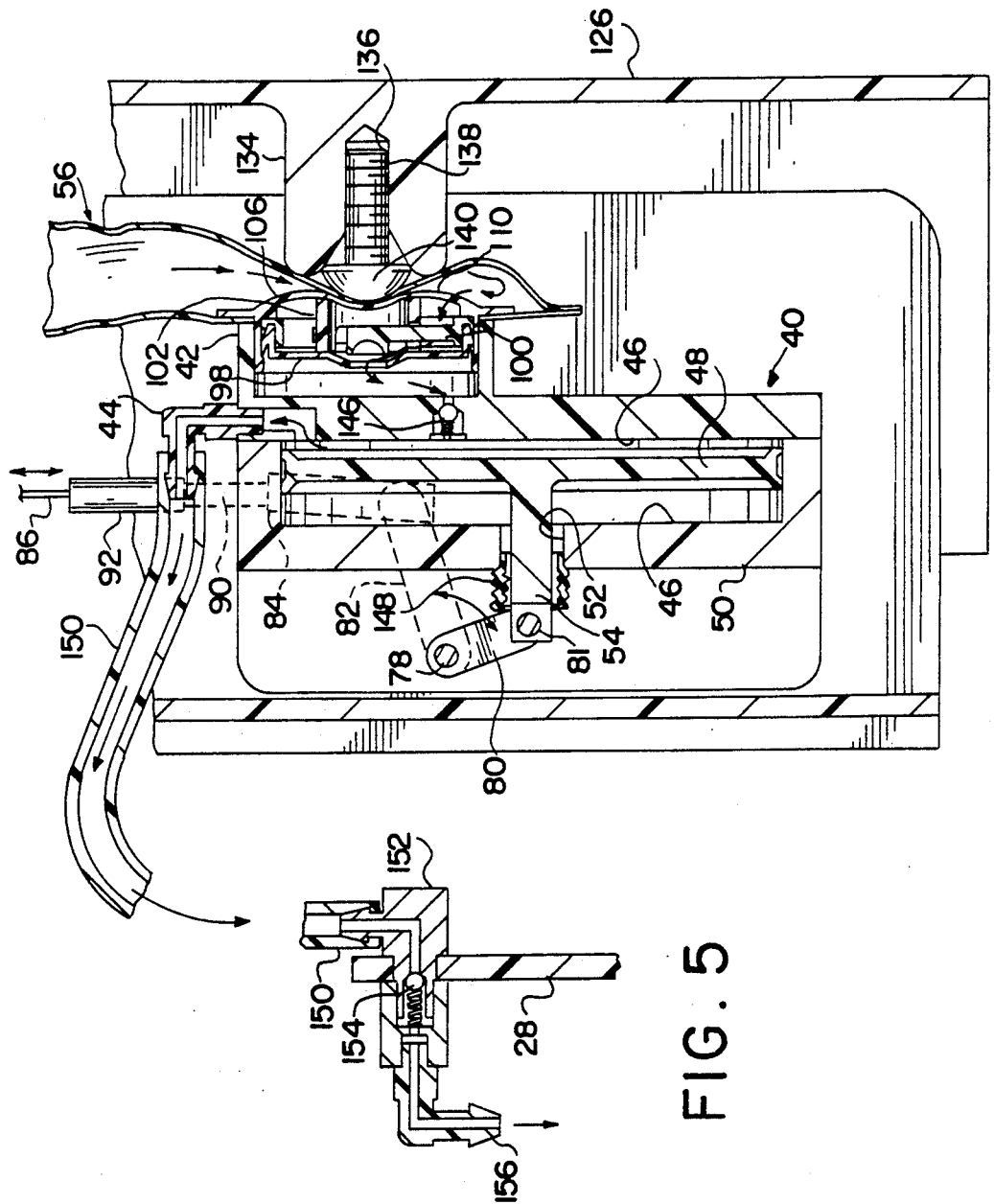
FIG. 5 is yet another partially-fragmented side view, in section, on the scale of FIG. 4 and also partially in phantom line.

Device 26 further includes a pump 40 (FIGS. 2-5), preferably removably mounted on frame 28. Pump 40 includes a pump inlet 42, a pump outlet 44, and a pump chamber 46 (FIGS. 4 and 5). The pump chamber 46 is in fluid communication with pump inlet 42 and pump outlet 44. Pump chamber 46 as well as the opening of pump inlet 42 (FIG. 2) are each preferably circular in transverse cross section. Pump chamber 46 thus defines a cylindrical cavity having a centrally-aligned axis. Pump 40 further includes a diaphragm or piston 48 (also preferably circular in transverse cross section), disposed within pump chamber 46, for purposes of transferring liquid from pump inlet 42 to pump outlet 44. One sidewall 50 of pump 40 includes a through bore 52, preferably so located relative to sidewall 50 as to be aligned with the centrally-located axis of pump chamber 46. Diaphragm or piston 48 includes a piston stem 54, disposed through bore 52.

Figure 2:
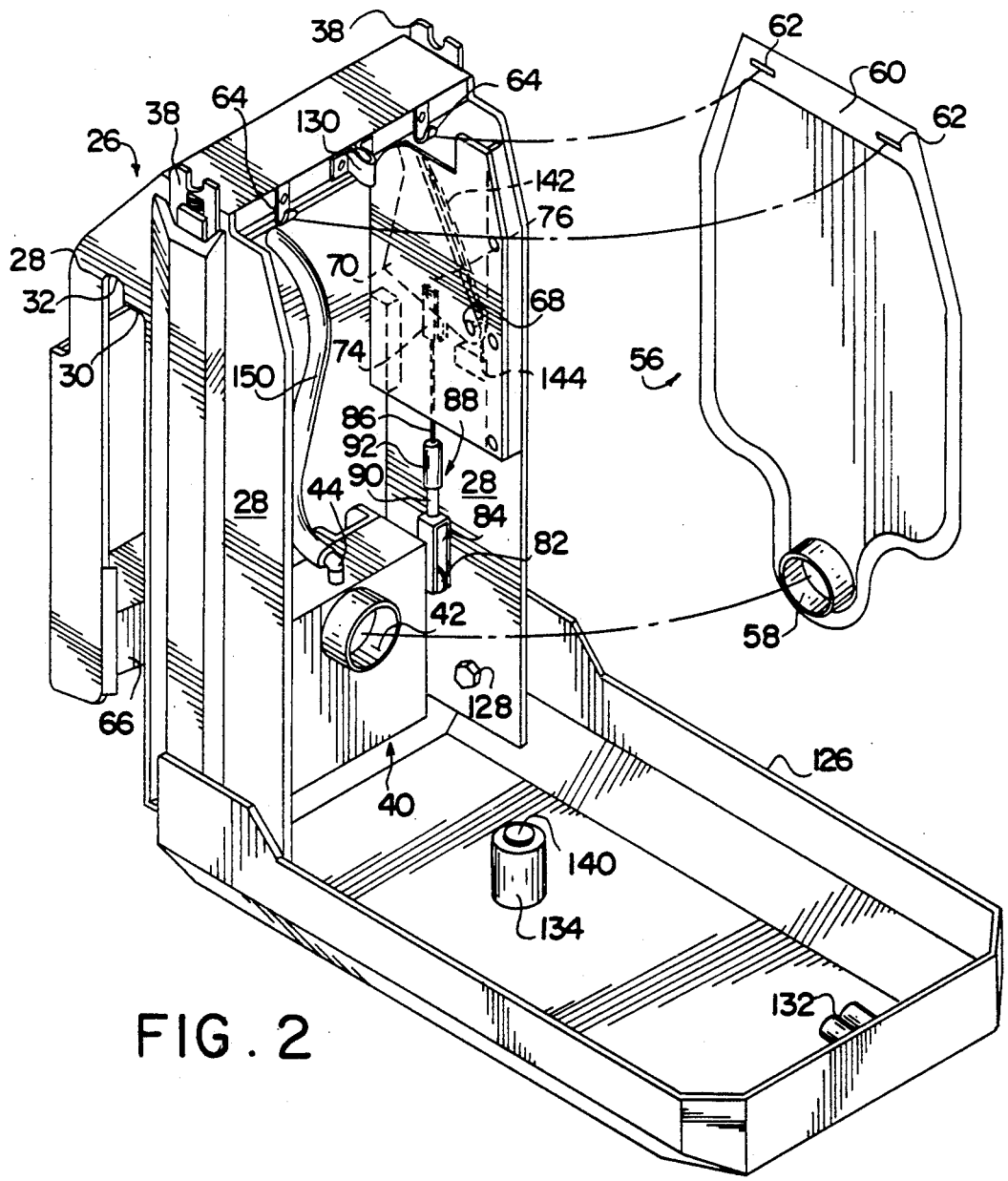
FIG. 2 is another perspective view, on a slightly-enlarged scale relative to FIG. 1, illustrating certain elements or components of a preferred embodiment of a liquid concentrate-containing pouch that is specifically adapted to be removably hung from specified structure of the fluid-metering device.

Device 26 also includes a flexible-plastic container or pouch 56. Certain elements or components of pouch 56 are shown in FIG. 2 while certain other elements or components of pouch 56 are shown in FIGS. 4-7. Pouch 56 is specifically adapted or designed for containment of a dilutable fluid such as liquid soap concentrate. Pouch 56 includes a flexible-plastic pouch outlet or sleeve 58 and an edge margin 60 (FIG. 2), located opposite the pouch outlet or sleeve 58 and defining a pair of spaced-apart slits 62 through edge margin 60. The external periphery of pouch outlet 58, moreover, is so dimensioned relative to the opening of pump inlet 42 as to enable pouch outlet 58 to be snugly removably disposable into the opening of pump inlet 42 for purposes of providing a fluid-tight seal therebetween.

Device 26 further includes hooks 64, preferably removably fixed to frame 28. Hooks 64 are so located on frame 28 as to enable pouch 56 to be hung downwardly from frame 28 at hooks 64 (FIG. 2), for purposes of enabling pouch outlet 58 to be disposed into the opening of pump inlet 42 (FIG. 3) to thereby provide the fluid-tight seal mentioned above.

Device 26 further includes a float mechanism 66, shown in phantom line in FIG. 1 as being disposed into bucket 20. Float mechanism 66 is pivotally operatively connected to piston 48, and the details of such pivotal connection will now be discussed.

Frame 28 includes a pair of spaced-apart fixed rocker pins 68, one of which is shown in the background in FIG. 2 (the other of which, not visible in FIG. 2, is located in the foreground). Frame 28 further includes a corresponding pair of spaced-apart rockers 70, each pivotally mounted on a respective one of the two rocker pins 68. A pair of spaced-apart relatively-stiff elongated members 72 (FIG. 3) pivotally operatively connect spaced-apart portions of float 66 to respective ones of the two rockers 70. Hanging from each rocker 70 is a respective clevis 74, pivotally mounted on pin 76 fixed to each such rocker 70. End portions of an elongated pivot member 78 (FIGS. 4 and 5) are respectively rotatably carried by frame 28; and a central portion of pivot member 78 is located adjacent to piston stem 54. In particular, fixed to pivot member 78 is a pair of spaced-apart arms 80, which straddle piston stem 54 and are pivotally connected thereto via pin 81. Also fixed to pivot member 78 is a second pair of spaced-apart arms 82 (FIG. 2), straddling the first pair of arms 80 and so located relative to the rockers 70 as to be aligned beneath a corresponding one thereof. Pivotally connected to each such second arm 82 is a second clevis 84 (FIG. 2), straddling each such arm 82.

Wire 86 is used to connect a first (or upper) clevis 74 to a corresponding second (or lower) clevis 84; and reference is now drawn to FIG. 2 for purposes of discussing the details with respect to the background view depicted. In particular, wire 86 (FIG. 2), fixed at its upper end to first or upper clevis 74 is rotatably fixed at its lower end to a tension-adjustment device 88. In particular, the tension-adjustment device 88 includes a cylindrical externally-threaded member 90, fixed to lower clevis 84, and an elongated tubular internally-threaded member 92, rotatably fixed to the lower end of wire 86. The internal threads of tubular member 92 are specifically designed to mesh with the external threads of member 90. Thus, when the threads of members 90 and 92 are intermeshed, and when one of the elongated members 90 or 92 is rotated about a common longitudinal axis relative to the other such member, the tension in wire 86 can be reduced or increased, as desired. Such adjustment of tension of wire 86 is for purposes of adjusting the movement of piston 48 in pump chamber 46, in response to certain up-and-down movement of float 66, which will be discussed in greater detail hereinbelow. Before discussing those details which respond to the up-and-down motion of float 66, however, certain additional elements or components of pouch 56 will now be discussed, for purposes of enabling the reader to clearly understand how the liquid concentrate is passed from pouch 56 into pump 40.

In that regard, the illustrated preferred embodiment of pouch 56 includes an outlet aperture 94 (FIG. 7), located in an end portion of pouch 56. Pouch 56 further includes a valve assembly 96 (FIG. 7) which comprises a flexible-plastic cover 98, a flexible-plastic collar 100, a spacer 102, and the above-mentioned flexible-plastic pouch outlet or sleeve 58. Sleeve 58 is tubular and is so dimensioned relative to pouch aperture 94 as to be disposable therein. Sleeve 58 includes, along one end portion thereof, a radially-outwardly disposed integral annular flange 104. Flange 104 is so dimensioned relative to pouch aperture 94 as to be sealingly engageable in a fluid-tight manner with that peripheral portion of pouch 56 which surrounds pouch aperture 94. In particular, flange 104 can, for example, be adhesively bonded or thermally welded, as desired, to such peripheral pouch portions surrounding aperture 94, using well-known methods, to achieve such a result.

Flexible-plastic sleeve 58 further includes, at the flanged end thereof, an integral domed surface 106 (FIG. 4) of convex curvature. Sleeve 58, being hollow, also includes an opening opposite the domed surface 106. Domed surface 106 preferably includes a first fluid inlet port 108, centrally located on domed surface 106, and a second fluid inlet port 110 (FIG. 7), spaced from port 108.

Flexible-plastic collar 100 is annular and has a circumferential portion 112 that is so dimensioned relative to the opening of hollow sleeve 58 as to be snap-engageable therewithin. The annular collar 100 further includes radially-disposed arms 114 which are unitary both with the collar circumferential portion 112 and a plug 116 that is located centrally of the collar circumferential portion 112. The collar circumferential portion 112, moreover, defines an annular slot 118.

Flexible-plastic cover 98 has a peripheral portion 120 that is so dimensioned relative to the collar 100 as to be snap-engageable within the collar annular slot 118 in a fluid-tight manner (FIGS. 4-6) for providing a fluid-tight seal between the cover 98 and the collar 100. Cover 98, moreover, includes an aperture 122 so dimensioned relative to the collar plug 116 and so aligned therewith, when the cover 98 and collar 100 are snap-engaged together in the manner described above, as to enable the cover aperture 122 and collar plug 116 to together define a valve for pouch 56. To achieve such a result, flexible cover 98 is biased toward and abuttingly engages collar plug 116, when cover 98 and collar 100 are thus snap-engaged together, for purposes of keeping the above-described valve of pouch 56 closed. (Please refer to FIGS. 4-6.)

Spacer 102 is disposed between the sleeve domed surface 106 and the apertured cover 98. Spacer 102 is so sized, relative to cover 98 and domed surface 106, as to have one end portion that is abuttingly engaged by portions of the sleeve domed surface 106 when opposite end portions of spacer 102 are in abutting engagement with that annular portion of cover 98 (FIG. 4) which surrounds cover aperture 122. The sidewall of spacer 102 further includes longitudinal slots 124 (FIG. 7), which are so arranged about the sidewall periphery and which are so longitudinally dimensioned relative to the collar arms 114, as to enable an end portion of spacer 102 to abuttingly engage that annular portion of cover 98 surrounding cover aperture 122, whenever domed surface 106 is depressed either or relaxed, for purposes of respectively opening and closing the above-defined pouch valve. (Please compare FIGS. 4 and 5.)

Certain additional aspects or features of device 26, which co-operate in general with pouch 56 and in particular with valve assembly 96, will now be discussed.

First of all, to enable pouch 56 to be contained within device 26, the illustrated preferred embodiment of device 26 includes a cover 126 (FIG. 3) pivotally connected to frame 28 by removable threaded fasteners 128, one of which is shown in the background in FIG. 2. Further, a spring-metal latch 130 (FIGS. 2 and 3), generally diamond-shaped in transverse cross section, is removably affixed to frame 28. Spring-biased rollers 132 are removably affixed to cover 126. Both the latch 130 and rollers 132 are in distal relation to threaded fasteners 128. The latch 130 and rollers 132 are so respectively located on frame 28 and cover 126, moreover, as to releasably interfit, enclosing pouch 56 in device 26, when pouch 56 is hung from hooks 64 and the device cover 126 closed, as is shown in FIG. 3. In particular, rollers 132 (there are two) are spring-biased together for purposes of enabling latch 130 to be releasably retained therebetween.

Secondly, device cover 126 further includes a mount 134 unitary with cover 126 and disposed inwardly, in the sense that cover 126 is "closed onto" frame 28 in the manner described above. Mount 134, moreover, includes a cylindrical recess 136 (FIGS. 4 and 5), which is internally threaded for purposes of intermeshingly receiving an elongated threaded adjustment member 138. With threaded adjustment member 138 threadingly engaged within the threads of recess 136 of mount 134, rotation of adjustment member 138, about its longitudinal axis, relative to mount 134, moves adjustment member 138 inwardly or outwardly of recess 136, depending upon the direction or "sense" of rotation of member 138 relative to mount 134. Unitary with the threaded, longitudinal portion of adjustment member 138 is a protuberance or "button" 140 which extends from mount 134 when threaded adjustment member 138 is threadedly engaged within recess 136. The protuberance or "button" 140 is so dimensioned relative to spacer 102, moreover, as to cause spacer 102 to co-act with cover 98 for purposes of opening and closing the pouch valve in the manner described above. In particular, mount 134 is so located on device cover 126 as to cause button 140 to so depress domed surface 106 as to cause spacer 102 to abuttingly engage cover 98, thereby opening the pouch valve when the device cover 126 is in the "closed" position on frame 28. (Please compare FIGS. 4 and 5 in conjunction with FIG. 3.) Until the pouch valve is opened, soapy liquid concentrate contained within pouch 56, and shown as fluid "F" in FIG. 6, remains in pouch 56. With the pouch valve thusly open, however, fluid "F" is able to freely flow through inlet port 110 (see, e.g., FIG. 6) of domed surface 106, and thereafter out of the pouch valve and into pump inlet 42.

Certain other advantages or features of device 26 will now be discussed.

Prior to using device 26, pump 40 must be "primed". That is, fluid "F" must be introduced into pump chamber 46. To "prime" pump 40, I prefer to move float 66 from a first or lower position (shown in FIG. 3) to a second or upper position (also shown in FIG. 3, but in phantom line). Elongated spring members 142 (one of which is shown in phantom line in the background in FIG. 2), carried by frame 28, bias the float 66 downwardly, back to its first or lower position. To achieve such a result, one end of each spring member 142 is retained by a separate keeper block 144 fixed to frame 28; and the other end of each such spring member 142 is fixed to a respective rocker 70. Each such spring member 142, moreover, is so biased as to cause its respective rocker 70 to force float 66 back to its lower position.

The up-and-down movement of float 66 from its lower position, then to its upper position, and finally to its lower position in turn defines a "first cycle" for diaphragm or piston 48 within pump chamber 46, as is illustrated in the preferred embodiments shown in FIGS. 3-5. In particular, moving float 66 to its upper position (FIG. 3) causes piston 48 to move to the right within pump chamber 46, as is illustrated in the preferred embodiment shown in FIG. 5. With fluid "F" already present in pump inlet 42, and with piston 48 thus arranged within pump chamber 46, fluid "F" in pump inlet 42 is drawn into pump chamber 46 when piston 48 moves back to its original position (shown in FIG. 4), thereby "priming" pump 40. Such reciprocating movement of piston 48 within pump chamber 46 is thus defined as the above-mentioned "first cycle", the purpose of which is to draw fluid "F" into the pump chamber 46 via the pump inlet 42. Pump 40, moreover, further preferably includes a spring-biased ball valve 146 (FIGS. 4 and 5) to prevent backflow of fluid "F" from pump chamber 46 back into pump inlet 42.

With pump 40 thus primed, device 26 is ready for use. In operation, device 26 is mounted on an upper wall portion of bucket 20 in a manner so as to dispose float 66 into bucket 20. (Please refer to FIG. 1.) When the bucket is filled with tap water or another suitable diluting fluid, float 66, which is so designed as to be buoyant relative to water, is caused by the rising liquid level (being added to the bucket) to move upwardly relative to the lower position of float 66. Such upward movement by float 66 in turn causes fluid in pump chamber 46 to be displaced therefrom and to be discharged from pump outlet 44, as a result of the movement of piston 48 in pump chamber 46. I prefer to define such reciprocating movement of piston 48 within pump chamber 46 as a "second cycle", the purpose of which is to cause fluid "F" in pump chamber 46 to be discharged from pump outlet 44.

The amount of fluid "F" thus displaced from pump chamber 46 is, of course, dependent upon a number of design details of pump 40, such as cross-sectional area of piston 48, total volume of pump chamber 46, and so forth. Indeed, these and other design details of pump 40, all such details being well known to those in the pump-designing arts, have been employed so that pump 40 is able to automatically meter precise predetermined volumetric quantities of fluid "F" into bucket 20, for purposes of producing a fluid-containing mixture of predetermined concentration, whenever water is added to bucket 20. For example, when bucket 20 is initially filled to its 100% level line, an initial volumetric quantity of fluid such as soapy liquid concentrate will be added to the water, by operation of device 26, to produce a predetermined desired soap concentration in bucket 20. Further, after a portion of the total amount of soapy water in bucket 20 is used and it is desirable to increase the total volume of soapy water available, for purposes of completing a job, additional water, incorporated into the original soapy mixture, will cause additional soapy liquid concentrate to automatically be metered into bucket 20, by operation of device 26, to again achieve substantially the same predetermined soapy liquid concentration as was produced initially. That is, pump chamber 46 has been so dimensioned relative to the 5-gallon bucket 20 as to cause that soapy liquid mixture, produced when water is added to an initially empty bucket, to be a predetermined desired concentration. Moreover, the volumetric amount of fluid that is displaced from pump chamber 46 into bucket 20 as a result of left-to-right movement of piston 48 in pump chamber 46 in response to vertical displacement of float 66 in bucket 20, is specifically so ratioed to the total amount of left-to-right movement as to enable precisely ratioed volumetric amounts of soapy liquid concentrate to be automatically metered into bucket 20, in situ, by device 26, to maintain the desired soapy mixture concentration, whenever additional water is added to the soapy mixture in bucket 20.

Still additional features or advantages of device 26 will now be discussed.

A corrugated flexible-rubber boot 148 (FIGS. 3-5) snugly circumferentially surrounds a portion of piston stem 54 and is disposed into an end of bore 52 for purposes of providing a fluid-tight seal between bore 52 and piston stem 54. In particular, that end portion of boot 148, disposed into bore 52, is so dimentioned relative to bore 52 and piston stem 54 as to allow piston stem 54 to move to the left (FIG. 4) and to the right (FIG. 5), relative to pump sidewall 50, enabling piston or diaphragm 48 to reciprocatingly move within pump chamber 46 between the first and second positions mentioned above, while providing a fluid-tight seal between through bore 52 and piston stem 54. Moreover, because pivot member 78 is rotatably carried by frame 28, the flexible nature of rubber boot 148 further enables slightly upward movement of the pinned end of piston stem 54 (detail not shown) relative to the central axis of through bore 52 when the piston stem 54 is moved from left (FIG. 4) to right (FIG. 5) relative to pump sidewall 50, while maintaining the above-mentioned fluid-tight seal between through bore 52 and piston stem 54.

To enable liquid concentrate to be pumped to a desired location, pump 40 further includes an elongated piece of flexible tubing 150 (FIG. 3), one end of which is removably affixed to pump outlet 44. The other end of flexible tubing 150 is preferably removably affixed to a fitting 152 (FIG. 3), carried by frame 28 of device 26. In particular, fitting 152 includes a spring-biased ball valve 154 (FIGS. 4 and 5) for purposes of preventing backflow of fluid from fitting 152 back into tubing 150. Moreover fitting 152 further includes a fluid concentrate discharge port 156 which is preferably so disposed as to meter liquid concentrate into bucket 20 when the device is mounted atop a wall portion thereof in the manner described above.

What has been illustrated and described herein are preferred embodiments of a novel liquid-dispensing device as well as a novel combination comprising a portable liquid container and the liquid-dispensing device. Yet while my novel device and combination have been illustrated and described with reference to preferred embodiments, it is to be understood that my invention is not to be so limited. On the contrary, structural and functional equivalents as well as other alternatives, changes and modifications will become apparent to those skilled in the art upon reading the foregoing description. Accordingly, such equivalents, alternatives, changes and modifications are to be considered as forming a part of my invention insofar as they fall within the spirit and scope of the appended claims.

I claim:

1. A liquid-dispensing device comprising:
   a frame;
   pump means removably mounted on the frame and having a pump inlet, a pump outlet, and a pump chamber that is in fluid communication with the pump inlet and the pump outlet, the pump means including piston means disposed within the pump chamber for purposes of transferring liquid from the pump inlet to the pump outlet;
   a flexible-plastic pouch adapted for containment of a dilutable liquid, the pouch being removably carried by the frame and having a valved outlet so dimensioned relative to the pump inlet as to be removably engaged therewith in a fluid-tight manner;
   float means pivotally operatively connected to the piston means for causing the piston means to be reciprocatingly movable in the piston chamber between a first position and a second position for purposes of defining a first cycle which causes liquid to be drawn into the pump chamber via the pump inlet and for purposes of defining a second cycle which causes liquid in the pump chamber to be discharged from the pump outlet; and
   spring means carried by the frame for biasing the float means to the first position.

2. The liquid-dispensing device of claim 1 wherein the flexible-plastic pouch includes an outlet aperture, and wherein the pouch valved outlet is characterized as a valve assembly which includes:
   a hollow sleeve so dimensioned relative to the pouch outlet aperture as to be disposable therein, the hollow sleeve including along one end portion thereof a radially outwardly disposed integral flange so dimensioned relative to the pouch outlet aperture as to be sealingly engageable in a fluid-tight manner with a portion of the pouch surrounding the pouch outlet aperture, the sleeve also including an integral domed surface of convex curvature having at least one fluid inlet port, the domed surface of convex curvature being located at the sleeve end that includes the sleeve flange, the hollow sleeve further including an opening opposite the domed surface;
   an annular collar having a circumferential portion so dimensioned relative to the hollow sleeve opening as to be snap-engageable therewithin, the annular collar including radially-disposed arms unitary with the collar circumferential portion, the collar further including a plug unitary with the collar arms and disposed centrally relative to the collar circumferential portion, the collar circumferential portion defining an annular slot;
   a flexible cover defining an aperture and including a peripheral portion that is so dimensioned relative to the collar as to be snap-engageable within the collar annular slot in a fluid-tight manner for providing a fluid-tight seal between the cover and the collar, the aperture of the cover being so aligned with the collar plug and being so dimensioned relative thereto as to enable the aperture of the cover and the collar plug to together define a valve for the pouch, the flexible cover being biased toward and abuttingly engaging the collar plug for purposes of keeping the pouch valve closed; and
   a spacer disposed between the sleeve domed surface and the cover, the spacer having one end portion that is abuttingly engageable by portions of the sleeve domed surface, the spacer having an opposite end portion that is abuttingly engageable by portions of the cover surrounding the aperture of the cover, for purposes of opening the pouch valve.

3. In combination with a liquid container, a liquid-dispensing device comprising;
   a frame removably carried by a liquid container;
   pump means removably mounted on the frame and having a pump inlet, a pump outlet, and a pump chamber that is in fluid communication with the pump inlet and the pump outlet, the pump means including a piston means disposed within the pump chamber for transferring liquid from the pump inlet to the pump outlet;
   a flexible-plastic pouch adapted for containment of a dilutable liquid, the pouch being removably carried by the frame and having a valved outlet so dimensioned relative to the pump inlet as to be removably engaged therewith in a fluid-tight manner;
   float means disposed into the liquid container and pivotally operatively connected to the piston means for causing the piston means to be reciprocatingly movable in the piston chamber between a first position and a second position for purposes of defining a first cycle which causes liquid to be drawn into the pump chamber via the pump inlet and for purposes of defining a second cycle which causes liquid in the pump chamber to be discharged from the pump outlet; and
   spring means carried by the frame for biasing the float means to the first position.

4. The combination of claim 3 within the pump means includes biased valve means disposed between the pump inlet and the pump chamber for purposes of preventing liquid flow from the pump chamber back into the pump inlet.

5. The combination of claim 3 further including biased valve means carried by the frame and in fluid communication with the pump outlet for purposes of preventing liquid flow into the pump outlet.

6. The combination of claim 3 wherein the flexible-plastic pouch includes an outlet aperture, and wherein the pouch valved outlet is characterized as a valve assembly which includes:

a hollow sleeve so dimensioned relative to the pouch outlet aperture as to be disposable therein, the hollow sleeve including along one end portion thereof a radially outwardly disposed integral flange so dimensioned relative to the pouch outlet aperture as to be sealingly engageable in a fluid-tight manner with a portion of the pouch surrounding the pouch outlet aperture, the sleeve also including an integral domed surface of convex curvature having at least one fluid inlet port, the domed surface of convex curvature being located at the sleeve end that includes the sleeve flange, the hollow sleeve further including an opening opposite the domed surface;

an annular collar having a circumferential portion so dimensioned relative to the hollow sleeve opening as to be snap-engageable therewithin, the annular collar including radially-disposed arms unitary with the collar circumferential portion, the collar further including a plug unitary with the collar arms and disposed centrally relative to the collar circumferential portion, the collar circumferential portion defining an annular slot;

a flexible cover defining an aperture and including a peripheral portion that is so dimensioned relative to the collar as to be snap-engageable within the collar annular slot in a fluid-tight manner for providing a fluid-tight seal between the cover and the collar, the aperture of the cover being so aligned with the collar plug and being so dimensioned relative thereto as to enable the aperture of the cover and the collar plug to together define a valve for the pouch, the flexible cover being biased toward and abuttingly engaging the collar plug for purposes of keeping the pouch valve closed; and a spacer disposed between the sleeve domed surface and the cover, the spacer having one end portion that is abuttingly engageable by portions of the sleeve domed surface, the spacer having an opposite end portion that is abuttingly engageable by portions of the cover surrounding the aperture of the cover, for purposes of opening the pouch valve.

7. The combination of claim 6 wherein the liquid-dispensing device further comprises protuberance means carried by the frame and abuttingly engaging the sleeve domed surface for purposes of causing the spacer to keep the pouch valve open.

8. The combination of claim 7 wherein the liquid container is a wheeled 5-gallon bucket, wherein the flexible-plastic pouch contains a dilutable liquid concentrate, and further including a mop wringer carried by the bucket and so dimensioned relative to the liquid-dispensing device as to be disposed about the device.

* * * * *

UNITED STATES PATENT AND TRADEMARK OFFICE
CERTIFICATE OF CORRECTION

PATENT NO. : 5,092,377
DATED : March 3, 1992
INVENTOR(S) : Frederick J. Krumberger It is certified that error appears in the above-identified patent and that said Letters Patent is hereby corrected as shown below:

Col. 6, line 33, please delete the expression "depressed either", substituting the expression -- either depressed -- in place thereof.

Col. 10, line 66 (i.e., in claim 4), please delete the word "within", substituting the word -- wherein -- in place thereof.

Signed and Sealed this

First Day of June, 1993

Attest:

MICHAEL K. KIRK

Attesting Officer     Acting Commissioner of Patents and Trademarks